United States Patent
Goldstein et al.

(10) Patent No.: US 11,468,266 B2
(45) Date of Patent: Oct. 11, 2022

(54) TARGET IDENTIFICATION IN LARGE IMAGE DATA

(71) Applicant: Raytheon Company, Waltham, MA (US)

(72) Inventors: Jonathan Goldstein, Fredericksburg, VA (US); Stephen J. Raif, Sachse, TX (US); Philip A. Sallee, South Riding, VA (US); Jeffrey S. Klein, Fairfax, VA (US); Steven A. Israel, Fairfax, VA (US); Franklin Tanner, Ashburn, VA (US); Shane A. Zabel, Dallas, TX (US); James Talamonti, McLean, VA (US); Lisa A. Mccoy, Springfield, VA (US)

(73) Assignee: Raytheon Company, Waltham, MA (US)

( * ) Notice: Subject to any disclaimer, the term of this patent is extended or adjusted under 35 U.S.C. 154(b) by 352 days.

(21) Appl. No.: 16/586,465

(22) Filed: Sep. 27, 2019

(65) Prior Publication Data

US 2021/0097344 A1    Apr. 1, 2021

(51) Int. Cl.
*G06K 9/00* (2022.01)
*G06K 9/62* (2022.01)
(Continued)

(52) U.S. Cl.
CPC ......... *G06K 9/6257* (2013.01); *G06K 9/6262* (2013.01); *G06V 10/242* (2022.01);
(Continued)

(58) Field of Classification Search
CPC .. G06K 9/6257; G06K 9/3208; G06K 9/6262; G06K 9/6857; G06K 2209/21; G06K 2209/27
See application file for complete search history.

(56) References Cited

U.S. PATENT DOCUMENTS

| | | | |
|---|---|---|---|
| 2005/0281455 A1* | 12/2005 | Huang | G06V 30/413 382/156 |
| 2015/0016668 A1* | 1/2015 | Cheriyadat | G06V 20/176 382/103 |

(Continued)

OTHER PUBLICATIONS

"Airbus Ship Detection Challenge", Kaggle, [Online]. Retrieved from the Internet: <URL:https://www.kaggle.com/c/airbus-ship-detection>, (Accessed May 27, 2021), 2 pgs.

(Continued)

*Primary Examiner* — Avinash Yentrapati
(74) *Attorney, Agent, or Firm* — Schwegman Lundberg & Woessner, P.A.

(57) ABSTRACT

A machine receives a large image having large image dimensions that exceed memory threshold dimensions. The large image includes metadata. The machine adjusts an orientation and a scaling of the large image based on the metadata. The machine divides the large image into a plurality of image tiles, each image tile having tile dimensions smaller than or equal to the memory threshold dimensions. The machine provides the plurality of image tiles to an artificial neural network. The machine identifies, using the artificial neural network, at least a portion of the target in at least one image tile. The machine identifies the target in the large image based on at least the portion of the target being identified in at least one image tile.

20 Claims, 13 Drawing Sheets

(51) Int. Cl.
  *G06V 10/24* (2022.01)
  *G06V 30/24* (2022.01)
(52) U.S. Cl.
  CPC ...... *G06V 30/2504* (2022.01); *G06V 2201/07* (2022.01); *G06V 2201/10* (2022.01)

(56) References Cited

U.S. PATENT DOCUMENTS

| | | | | |
|---|---|---|---|---|
| 2015/0131848 | A1* | 5/2015 | Thirumaleshwara | G06N 20/10 382/103 |
| 2016/0375904 | A1* | 12/2016 | Satzoda | B60R 1/00 348/148 |
| 2017/0076442 | A1* | 3/2017 | Schoenmeyer | G06T 7/11 |
| 2018/0232607 | A1* | 8/2018 | Zhong | G06V 10/255 |
| 2020/0019752 | A1* | 1/2020 | Frei | G05D 1/0282 |
| 2020/0250461 | A1* | 8/2020 | Yang | G06T 7/11 |
| 2021/0365737 | A1* | 11/2021 | Chen | G06V 30/153 |

OTHER PUBLICATIONS

"Deep Learning Frameworks", NVIDA Developer, [Online], Retrieved from the Internet: <URL: https://developer.nvidia.com/deep-learning-frameworks>, (Accessed May 27, 2021), 7 pgs.

"Parallel Networks that Learn to Pronounce English Text", Complex Systems 1, (1987), 145-168.

Congalton, R, et al., "Chapter 5: Basic Analysis Techniques", Assessing the Accuracy of Remotely Sensed Data: Principles and Practice, Lewis Publishers, (1991), 43-64.

Foody, G M, et al., "The Effect of Training Set Size and Composition on Artificial Neural Network Classification", International Journal of Remote Sensing, vol. 16, No. 9, (1995), 1707-1723.

Fyfe, S, et al., "Mapping Marine Habitats in Otago, Southern New Zealand", Geocarto International, vol. 14, No. 3, (1999), 15-26.

Goodfellow, Ian, "NIPS 2016 tutorial: Generative adversarial networks", arXiv preprint arXiv:1701.00160, (2016), 57 pgs.

Han, Song, "EIE: Efficient Inference Engine on Compressed Deep Neural Network", arXiv preprint, arXiv:1602.01528v2, (May 3, 2016), 12 pgs.

He, Kaiming, et al., "Spatial Pyramid Pooling in Deep Convolutional Networks for Visual Recognition", IEEE Transactions on Pattern Analysis and Machine Intelligence, 37(9), (Sep. 2015), 1904-1916.

Hughes, G, "On the Mean Accuracy of Statistical Pattern Recognizers", IEEE Transactions on Information Theory, vols. IT-14, (1968), 55-63.

Israel, Steve, "Probabilistic and Connectionist Processing to Improve Image Pattern Recognition (Thesis)", University of Otago, New Zealand, (Jun. 4, 2021), 260 pages.

Israel, Steven, "Performance Metrics: How and When", Geocarto International, vol. 21, No. 2, (2006), 23-32.

Kataoka, Yuusuke, et al., "Image generation using generative adversarial networks and attention mechanism", EEE/ACIS 15th International Conference on Computer and Information Science, (2016), 6 pgs.

Krizhevsky, A., et al., "ImageNet classification with deep convolutional neural networks", Advances in Neural Information Processing Systems, 25(2), (2012), 1097-1105.

Li, Feng, et al., "Deep Models for Engagement Assessment with Scarce Label Information,", IEEE Transactions on Human-Machine Systems, vol. 47, No. 4., (2017), 598-605.

Lippmann, R, "An introduction to computing with neural nets", IEEE ASSP Magazine, IEEE, US, vol. 4, No. 2, (Apr. 1, 1987), 4-22.

Yosinski, J., et al., "How transferable are features in deep neural networks?", Advances in Neural Information Processing Systems, (2014), 1-9.

* cited by examiner

TARGET IDENTIFICATION IN LARGE IMAGE DATA

TECHNICAL FIELD

Embodiments pertain to computer architecture. Some embodiments relate to target identifications in images. Some embodiments relate to target identification in large image data.

BACKGROUND

Neural networks are used to identify targets (e.g., ships, tanks, airplanes, faces, cats, and the like) in images. Typically, the target occupies a large portion (e.g., at least 25%) of the pixels of the image. However, identifying relatively small targets in relatively large images (e.g., where one target occupies far less than 1% of the pixels of the image) may be challenging.

SUMMARY

Figure 1:
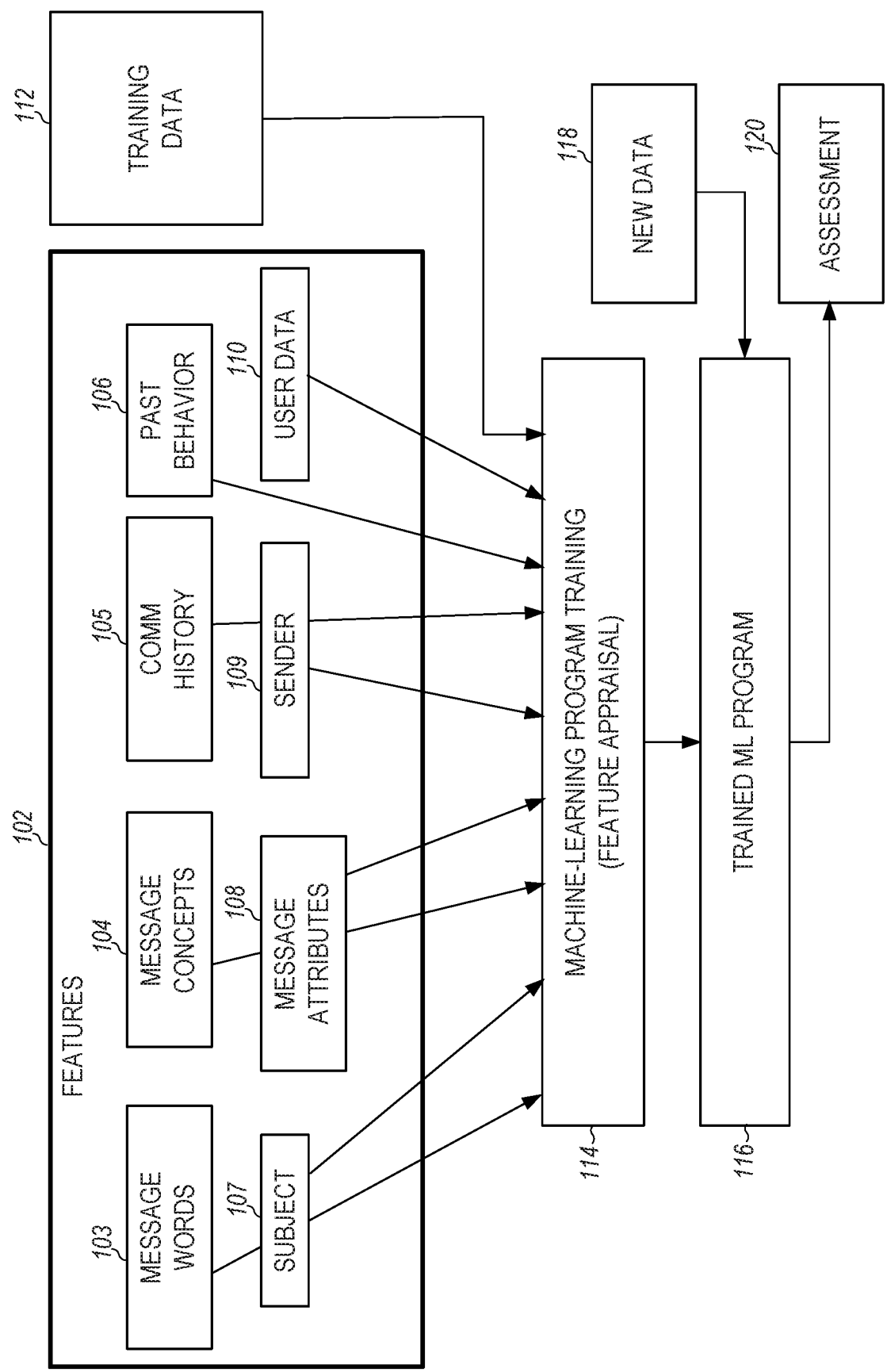
FIG. 1 illustrates the training and use of a machine-learning program, in accordance with some embodiments.

The present disclosure generally relates to machines configured to provide image processing, including computerized variants of such special-purpose machines and improvements to such variants, and to the technologies by which such special-purpose machines become improved compared to other special-purpose machines that provide technology for pattern recognition algorithms (e.g., neural networks, statistical algorithms, and the like). In particular, the present disclosure addresses target identification in large image data.

According to some aspects of the technology described herein, an image processing apparatus includes processing circuitry and memory. The processing circuitry receives a large image having large image dimensions that exceed memory threshold dimensions, the large image including metadata. The processing circuitry adjust an orientation and a scaling of the large image based on the metadata. The processing circuitry divides the large image into a plurality of image tiles, each image tile having tile dimensions smaller than or equal to the memory threshold dimensions. The processing circuitry provides the plurality of image tiles to an artificial neural network. The processing circuitry identifies, using the artificial neural network, at least a portion of the target in at least one image tile. The processing circuitry identifies the target in the large image based on at least the portion of the target being identified in at least one image tile.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, neural networks are used to identify targets (e.g., ships, tanks, airplanes, faces, cats, and the like) in images. Typically, the target occupies a large portion (e.g., at least 25%) of the pixels of the image. However, identifying relatively small targets in relatively large images (e.g., where one target occupies far less than 1% (e.g., 0.001% in some cases) of the pixels of the image) may be challenging. Some aspects of the technology disclosed herein are directed to identifying relatively small targets in relatively large images.

According to some implementations, a computing machine receives a large image having large image dimensions that exceed memory threshold dimensions. The large image includes metadata specifying, for example, rational polynomial coefficient(s) (RPC) and/or replacement sensor model(s) (RSM) of the large image. The computing machine adjusts an orientation and a scaling of the large image based on the metadata. Adjusting the orientation and scaling may include rotating the large image such that a gravitational downward direction corresponds to a direction toward a bottom side of the rotated large image, and scaling the large image such that a width and a height of a pixel in the scaled large image correspond to fixed physical dimensions. The computing machine divides the large image into a plurality of image tiles, each image tile having tile dimensions smaller than or equal to the memory threshold dimensions. A distance between center-points of two neighboring image tiles is determined based on the tile dimensions and target dimensions of a target to be identified within the large image. The target dimensions are smaller than the tile dimensions. The computing machine provides the plurality of image tiles to an artificial neural network (ANN). The computing machine identifies, using the artificial neural network, at least a portion of the target in at least one image tile. The computing machine identifies the target in the large image based on at least the portion of the target being identified in at least one image tile.

In some aspects, the computing machine (or another computing machine) trains the ANN. To train the ANN, the computing machine receives a large training image. The large training image has large training image dimensions that exceed the memory threshold dimensions. The computing machine divides the large training image into a set of training image tiles. The computing machine identifies, using the artificial neural network, at least a portion of the target in a subset of the training image tiles. The computing machine determines, without using the artificial neural network, whether the identification of the portion of the target in each training image tile from the subset is correct. The computing machine further trains the artificial neural network based on a determination whether the identification of the portion of the target in each training image tile is correct.

In some cases, the computing machine (or the other computing machine) trains the ANN to identify a position of the target in a given image tile that includes the target. The computing machine obtains a downsampled tile (based on the artificial neural network processing of the given image tile). It should be noted that some network architectures may not be downsampled, and a non-downsampled tile may be used in place of the downsampled tile. The downsampled tile may be generated as part of the artificial neural network processing chain, for example, the downsampled tile may be the output of block 411 of FIG. 4, described in detail below. Each pixel of the downsampled tile corresponds to a plurality of pixels in the given image tile. For each target in the downsampled tile, the computing machine (i) identifies, without using the artificial neural network, a pixel of the downsampled tile as being a centroid of the target, and (ii) labels the identified pixel as including the target. The computing machine labels all other pixels within the downsampled tile as non-target pixels. For each non-target pixel in the downsampled tile, the computing machine (i) computes a distance between the non-target pixel and a nearest target pixel, and (ii) if the distance is within a threshold value, marks the non-target pixel as possibly containing a portion of the target, and nullifies a training weight for the non-target pixel. The computing machine trains the artificial neural network to identify the position of the target based on the labeled pixels in the downsampled tile.

Some machine learning schemes are unable to process large commercial satellite imagery in native format. These frameworks typically ingest small 8-bit image chips with limited metadata. Some satellite images are far too large to be processed using a graphics processing unit (GPU) and come with useful metadata that can be leveraged to improve the artificial neural network performance. While a given satellite image may fit within GPU memory, the size of the processing structures might be roughly proportional to the image size, so the image cannot be processed even though it can fit. In addition, these frameworks are not tuned to perform object detection in background-dominated environments, a satellite image application which is of high interest.

Some satellite imagery datasets address the challenge of processing large imagery by chipping out portions of the images into common picture formats that do not retain associated metadata. Solutions based on these datasets are not going to (1) work on production imagery without additional preprocessing and (2) be competitive performance-wise with systems that account for the full imagery and metadata. Similarly, open source satellite imagery machine learning frameworks expect such chipped out and stripped images.

The large image problem may be addressed with two options: a chip-wise convolutional neural network (CNN) classifier or a custom region CNN object detector. In both options, the source image is scanned with a "marching window" including overlap to ensure that features are encapsulated in at least one chip/region. If available, the satellite inertial measurement unit (IMU) metadata is used to transform the image to "up-is-up" orientation with fixed physical scale. This transformation reduces the degrees of freedom in possible feature presentation which means less labelled data is needed to achieve a given performance level. One challenge in effectively training neural networks to detect/classify targets in satellite imagery is the domination of background imagery. According to some aspects, the key to overcome background domination is to balance the competing objectives of using the available training data, while training the artificial neural network on meaningful negative (background) examples. Some aspects achieve this balance by cycling through all training background samples while independently cycling "confuser" background samples at an operator specified ratio. The confusers are areas of the image that are found to be complex or similar to the target feature and are therefore more effective as training examples. Confusers can be generated from knowledge-based algorithm false alarms, CNN false alarms, or from geographically proximate areas to labelled targets.

Some aspects integrate the techniques listed above to train, test, and perform inference on satellite imagery. This automated processing may be used with a variety of image types.

Some automated target recognition applications are focused on precisely locating rare features within large swaths of background imagery. Standard region convolutional neural networks address object detection for a distinctly different environment: when features are common and labeled data comes in the form of bounding boxes or full segmentation. Such solutions might not conform to the available labeled data nor are they tuned to the primary objective of locating an object rather than classifying its footprint within the image. This discrepancy leads to inferior detection/false alarm performance or an inability to apply established architectures to the problems at hand.

Some schemes extrapolate from point-wise labels to bounding boxes based on the expected physical size of the target and the ground sample distance of the image. These derived bounding boxes are likely to be inaccurate. Further, even accurate bounding boxes might provide a poor encapsulation of features in images as there will be variable and significant portion of image content within the bounding box that is not the target of interest.

In some examples, the training engine acts on a downsampled feature map, which can be the output of an intermediary layer or the final convolutional layer of an artificial neural network. Some CNNs provide feature maps at several downsampled resolutions for tuning the fidelity of the output coordinates and network depth. Some aspects first process the feature map with a 1×1 filter convolutional layer with output channels matching the number of target classes plus one for the background. The output of this filter is a downsampled map with a vector of logits corresponding to the list of labels at each pixel. At inference, some aspects apply the appropriate regression model function to convert the logits to probabilities. At training, the cross-entropy can be similarly calculated and accumulated into a loss value. However, in some aspects, each pixel is labeled for the cross-entropy. A center point is identified for each target. Those coordinates are converted to the corresponding pixels in the downsampled space which are then assigned the target labels. All other pixel labels are set to background. Since the targets are extended, occupying multiple pixels even in downsampled space, the background labels might not be accurate for the pixels surrounding the center point. To account for this inaccuracy, some aspects establish an area around each labeled target as unknown classification and ignore the pixels by not including their contribution in the loss calculation. By only applying high confidence labels, label noise is reduced. In some cases, background pixels may vastly outnumber target pixels. In these cases if all pixels are equally weighted there is a risk that the artificial neural network may learn that always predicting background is an easy way to minimize loss. To prevent this, some aspects adjust the weights for a given batch such that the total potential loss contribution of all target pixels is equal to the total potential contribution from background pixels that are not on the ignore list. Some aspects can still train on pure background images while avoiding divide by zero errors as long as at least one image with target(s) is included in each batch.

Some aspects may include one or more of the following: (1) imposing an ignore buffer in a feature map around a pointwise labeled object centroid to reflect uncertainty on the object's presentation within an image; and (2) Weighting the loss function such that the small number of target pixels are balanced with the large number of background pixels within a batch.

As used herein, the term "large image" may include any image that exceeds memory threshold dimensions. The memory threshold dimensions may be, for example, one million by one million pixels. In some cases, the large image is compressed, with different compression ratios applied to different parts of the large image.

As used herein, the term "computing machine" may include a single computing machine or multiple computing machines. A computing machine may include any device or combination of devices that includes processing circuitry and memory. The processing circuitry and the memory may reside in the same device or in different devices.

Throughout this document, some method(s) (e.g., in FIGS. 7-9) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, the machine-learning program 116 may be asked to count the number of sedans and pickup trucks in a parking lot between 10:00 and 11:00. The machine-learning program 116 determines the required image quality to extract the information that is needed. The machine-learning program 116 determines if a target model exists for sedans and pickup trucks. The machine-learning program 116 locates images having the required image quality to extract the information that is needed. If such images do not exist for the given time and geographic location parameters, the machine-learning program 116 requests collection of such images for the given time and geographic location parameters. Upon receiving the requested or located images, the machine-learning program 116 pushes the images to the appropriate model.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
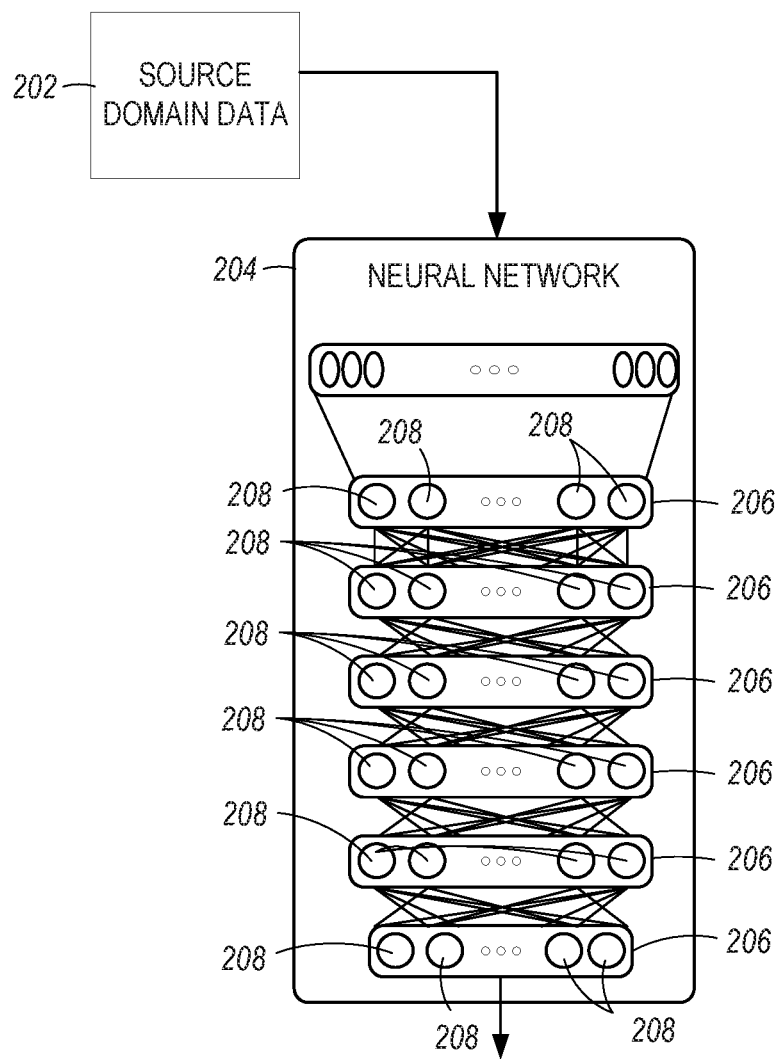
FIG. 2 illustrates an example neural network, in accordance with some embodiments.
Figure 2:
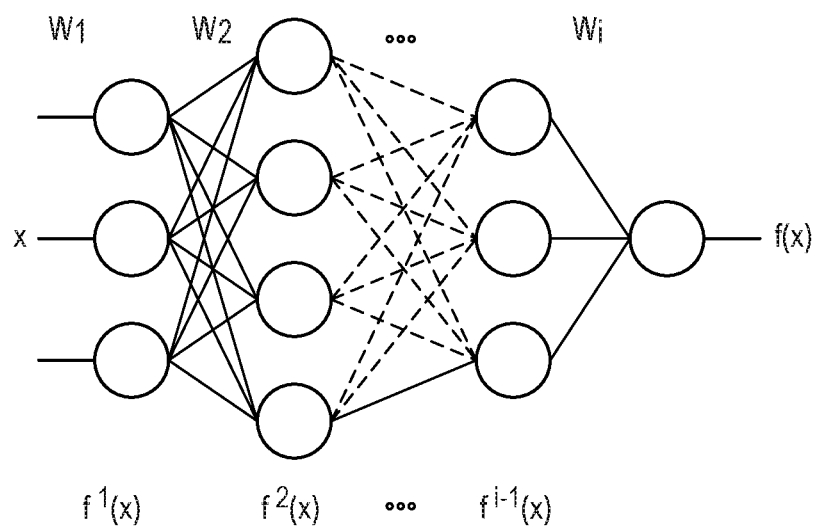

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output $f(x)$ is computed.

In some example embodiments, the neural network 204 (e.g., deep learning, deep convolutional, or recurrent neural network) comprises a series of neurons 208. A neuron 208 is an architectural element used in data processing and artificial intelligence, particularly machine learning on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized in various configurations of neural networks to provide interactions and relationship learning modeling for how each of the frames in an utterance are related to one another.

For example, a neural network node serving as a neuron includes several gates to handle input vectors (e.g., sections of an image), a memory cell, and an output vector (e.g., contextual representation). The input gate and output gate control the information flowing into and out of the memory cell, respectively. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., patterns in an image). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
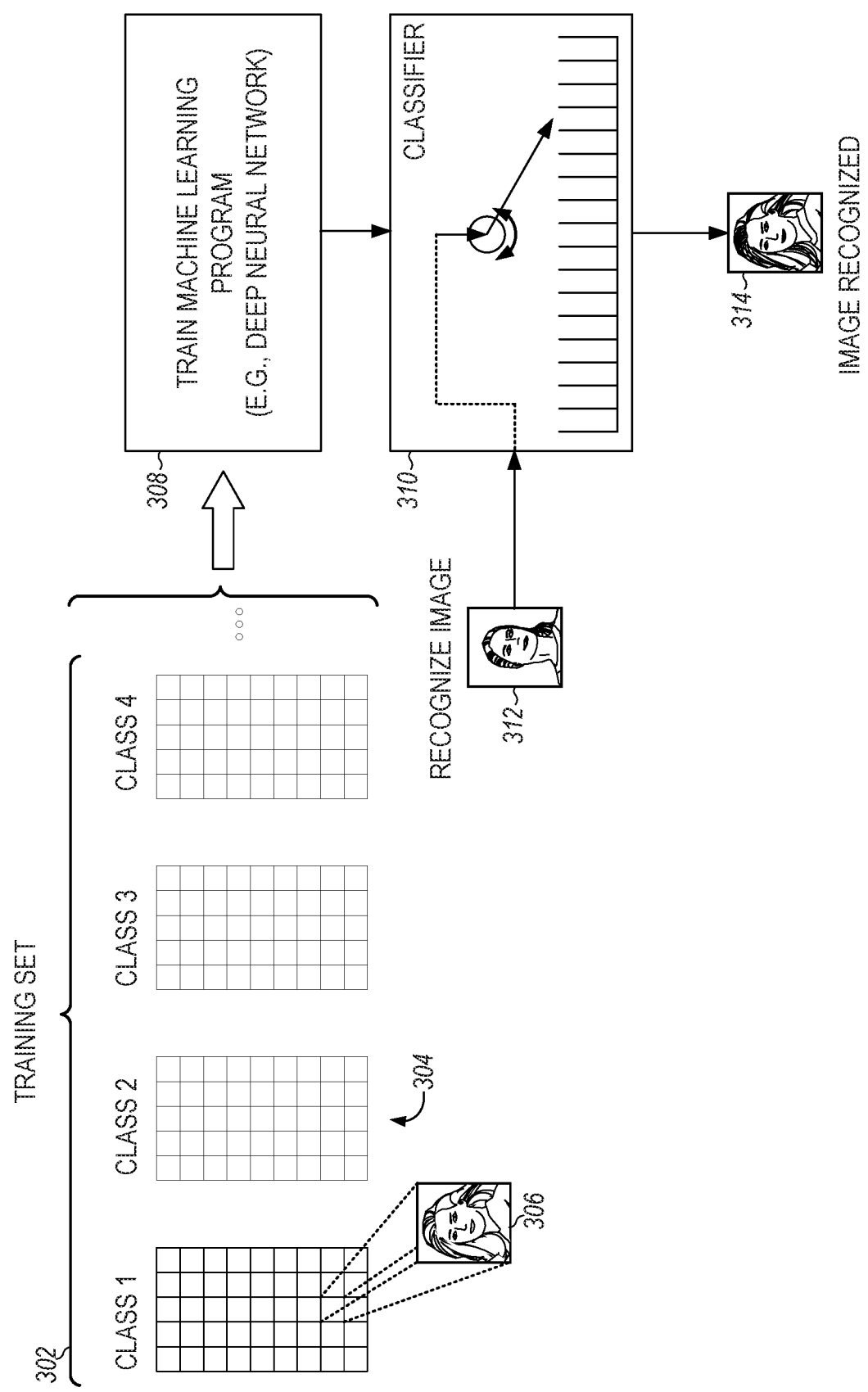
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
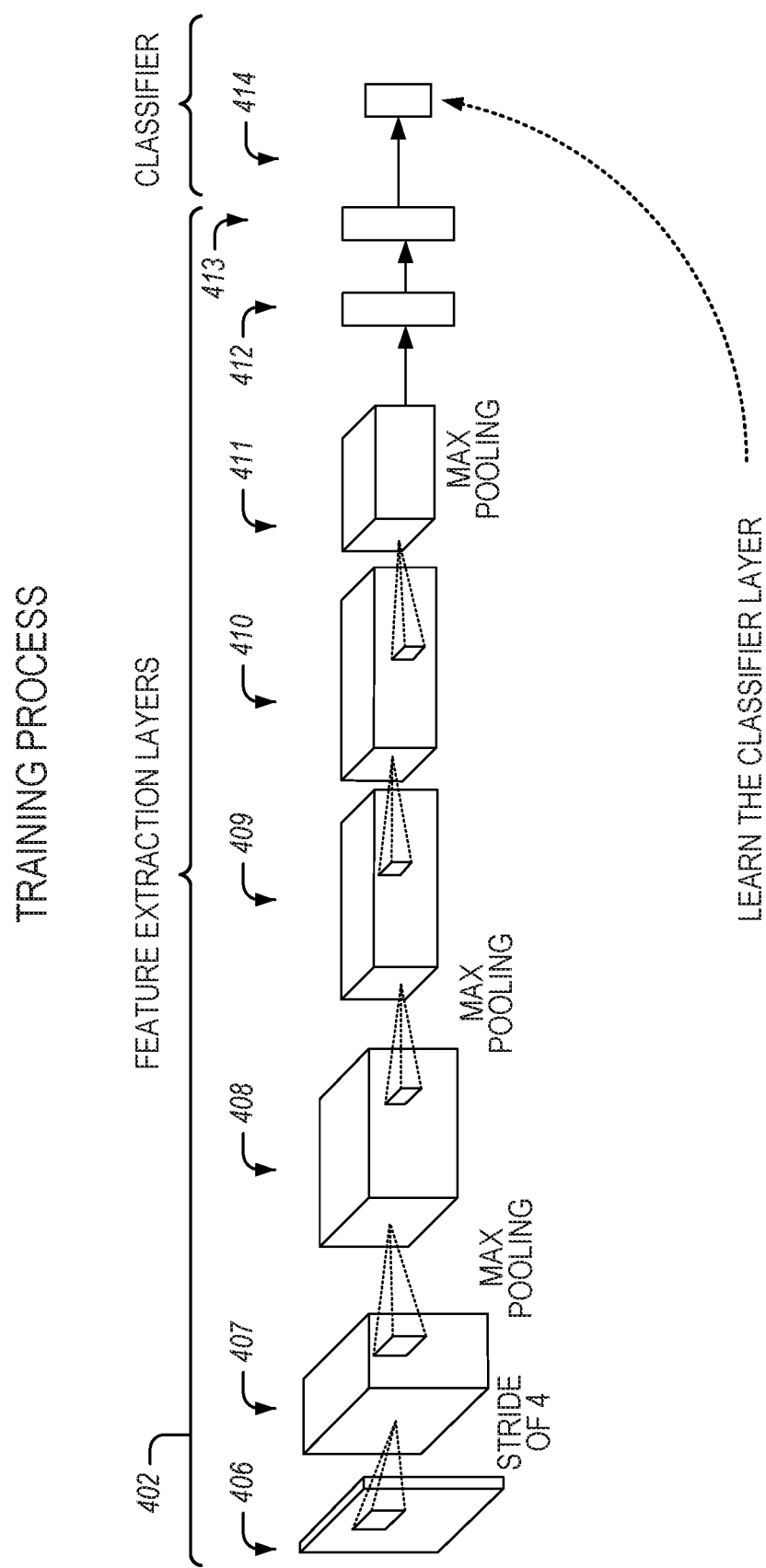
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved.

Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

FIG. 4 is described in conjunction with a "stride of 4." However, it should be noted that any other positive integer stride value may be used. Also, FIG. 4 describes some but not all examples of stages of neural network processing. Some aspects of the technology disclosed herein may implement one or more of: convolution, skip connections, activation, batch normalization, dropout, and the predictive function. Skip connections include shortcuts to jump over some layers (e.g., layer m provides input directly to layer m+2). An activation is a minimum amount of input that causes an artificial neuron to "fire" an output. Batch normalization is a technique for training very deep neural networks that standardizes the inputs to a layer for each mini-batch. This has the effect of stabilizing the learning process and dramatically reducing the number of training epochs required to train deep networks. Dropout sets the output of some neurons to zero in order to prevent a neural network from overfitting. The idea of dropout is to randomly drop units (along with their connections) from the artificial neural network during training. This prevents the units from co-adapting too much.

Figure 5:
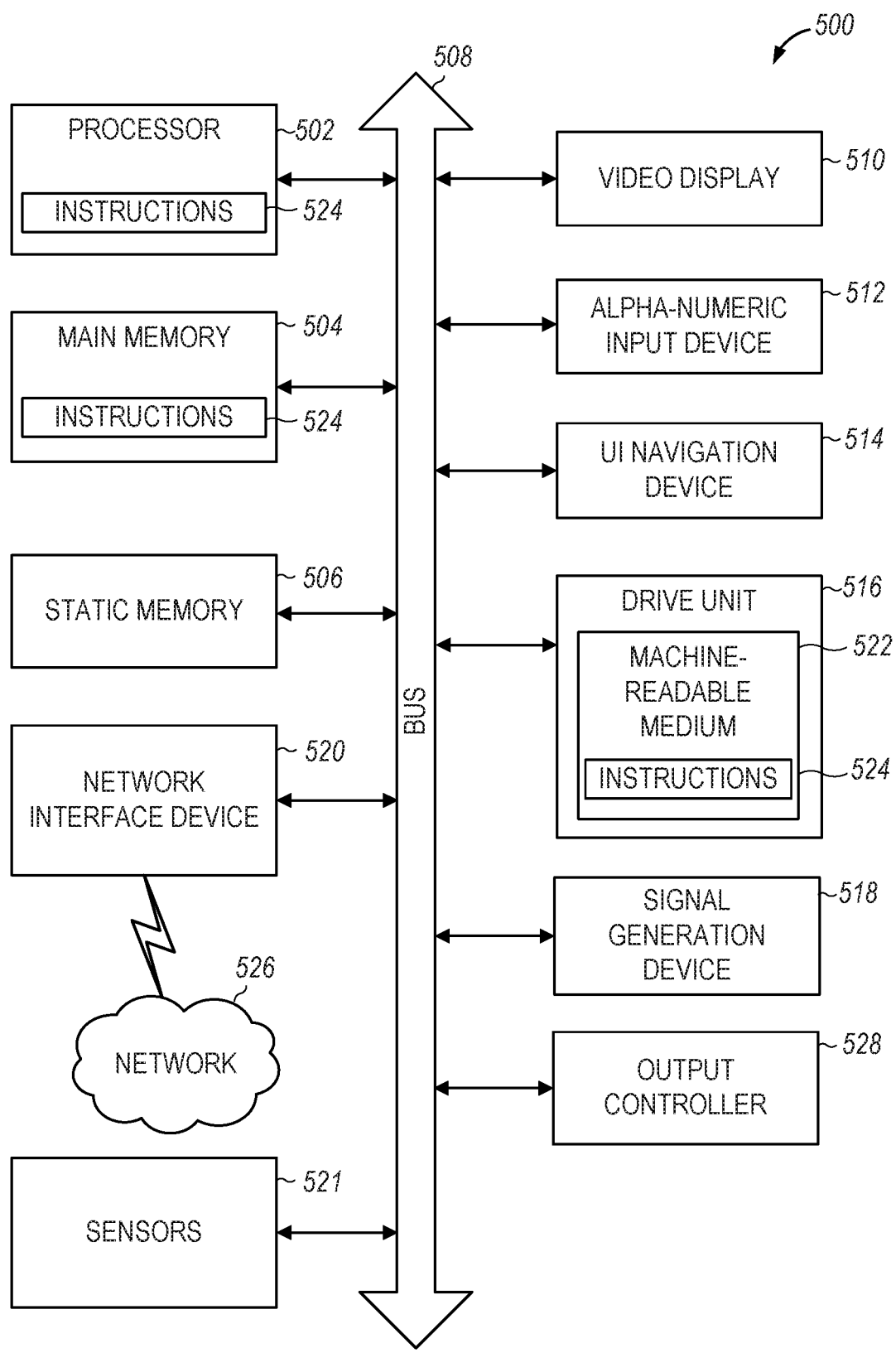
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

The technology disclosed herein uses various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

Figure 6:
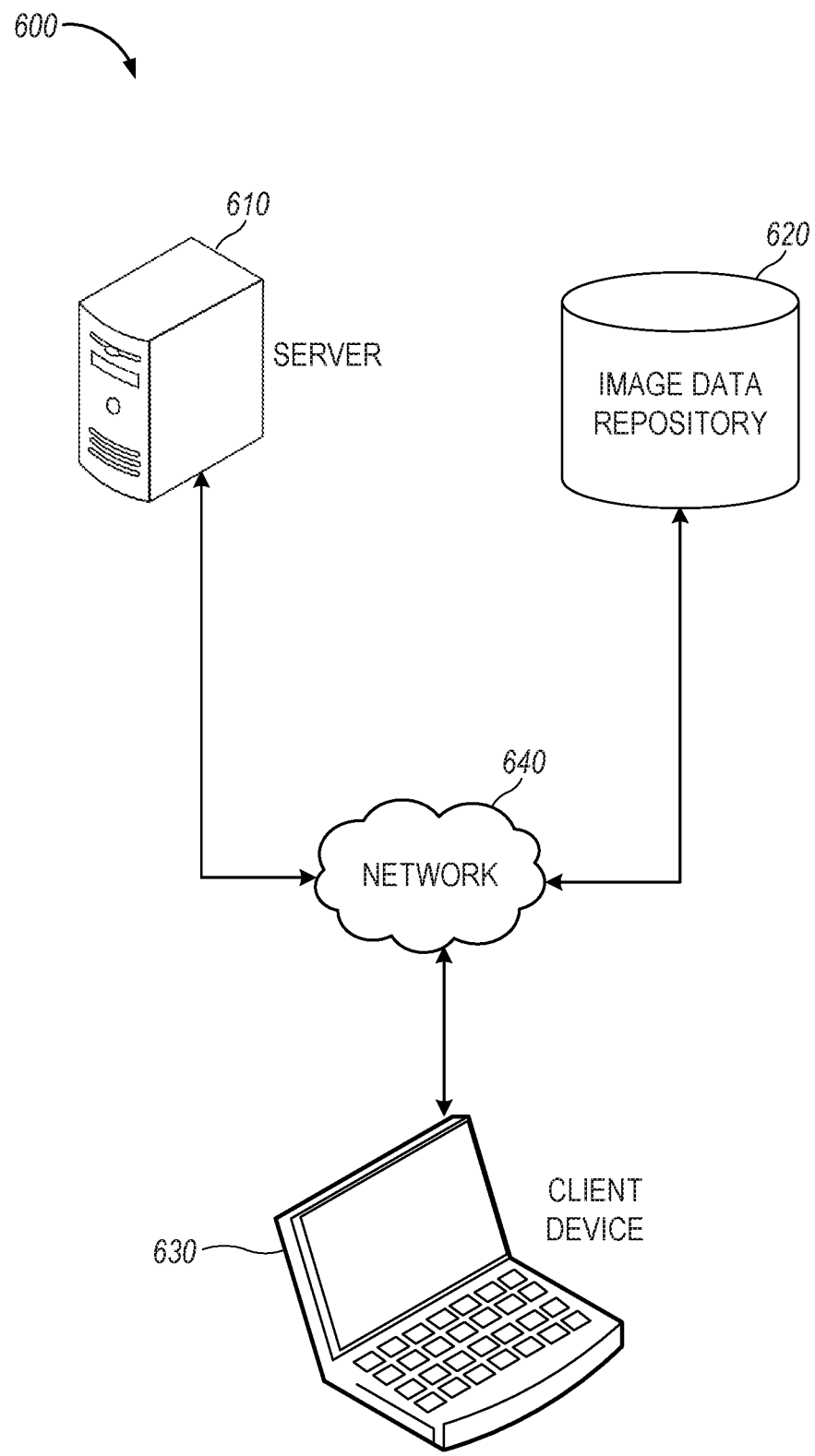
FIG. 6 is a block diagram of a network system, in accordance with some embodiments.

FIG. 6 is a block diagram of a network system 600, in accordance with some embodiments. As shown, the network system 600 includes a server 610, an image data repository 620, and a client device 630. In the illustrated embodiment the server 610, the image data repository 620, and the client device 630 communicate with one another via a network 640. The network 640 may include one or more of the internet, an intranet, a local area network, a wide area network, a virtual private network (VPN), and the like. In some other embodiments, the server 610 and the image data repository 620 may be co-located, and the server 610 may access the image data repository 620 without the network 640 (e.g., communicating via an internal bus).

The server 610 may be implemented as a single server, multiple servers, a server farm, and the like. The server 610 is configured to identify targets(s) in large image(s), train an artificial neural network to identify target(s) in large image(s), and/or to identify a positon of a target in an image tile. The server 610 may perform the methods 700, 800, and/or 900 discussed in conjunction with FIG. 7, FIG. 8, and/or FIG. 9. The server 610 may include all or a subset of components of the computing machine 500 illustrated in FIG. 5 and discussed above. In some embodiments, the client device 630 may perform the methods 700, 800, and/or 900 discussed in conjunction with FIG. 7, FIG. 8, and/or FIG. 9. The client device 630 may include all or a subset of components of the computing machine 500 illustrated in FIG. 5 and discussed above.

The image data repository 620 stores images for processing by the server 610 and/or for display at the client device 630. The images stored in the image data repository 620 may include large images and/or not large images. The images may include images captured via one or more imaging devices (e.g., cameras) located on one or more satellites, manned or unmanned vehicles (aerial, sea or land based), or on other stationary and/or mobile platforms.

The client device 630 may include one or more of a laptop computer, a desktop computer, a mobile phone, a tablet computer, a smart watch, a personal digital assistant (PDA), a digital music player, and the like. The client device 630 may include a camera for generating image(s) and/or a display unit (e.g., a screen or a monitor) for displaying image(s) to a user. The image(s) at the client device 630 may be provided to the server 610 for processing and/or to the data repository 620 for storage.

As illustrated in FIG. 6, the network system 600 includes a single server 610, a single image data repository 620, and a single client device 630. However, in some aspects, the network system 600 may include multiple servers, image data repositories, and/or client devices. In some aspects, a single computing machine performs the functions of two or more of the server 610, the image data repository 620, and the client device 630.

Figure 7:
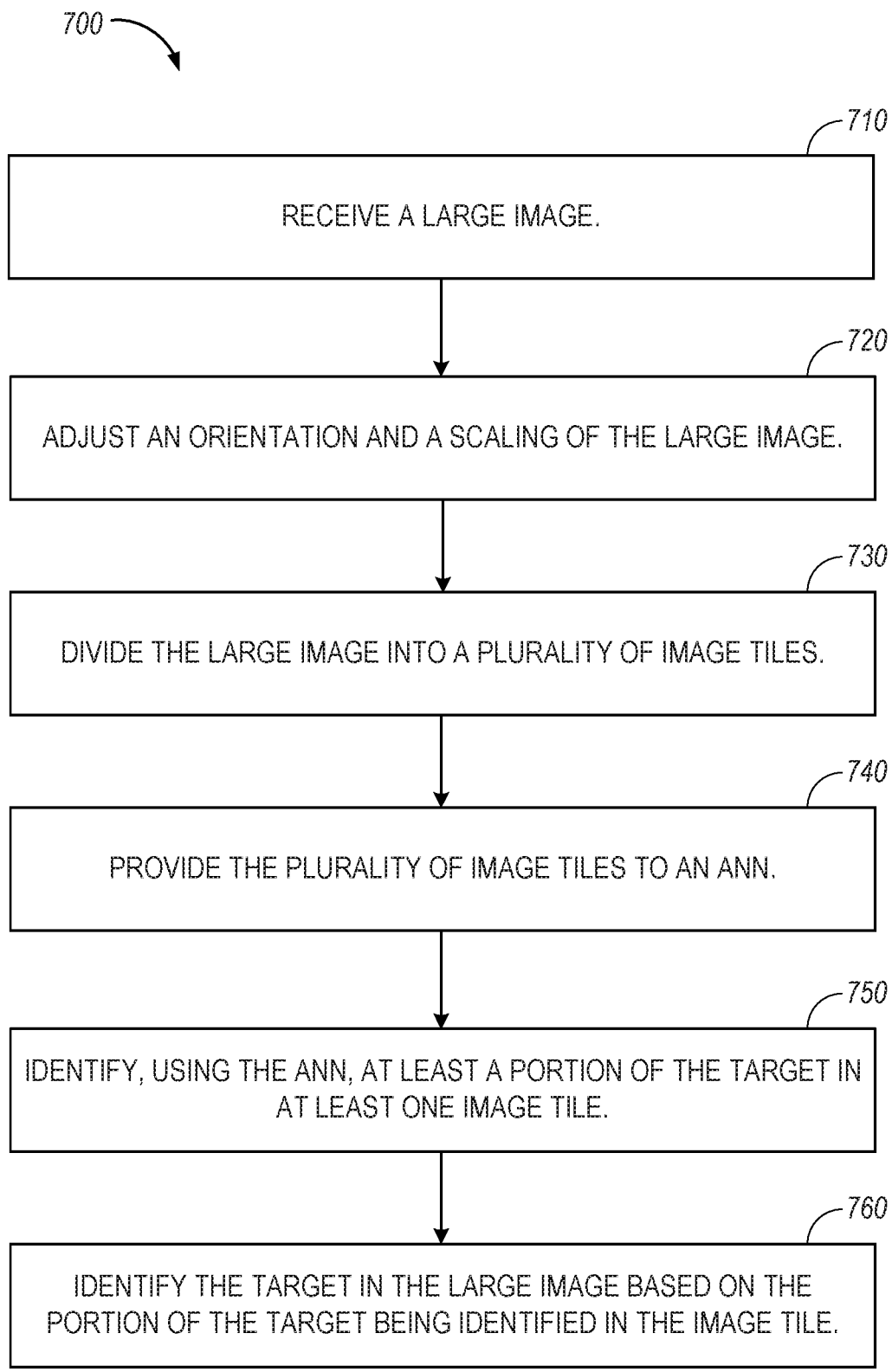
FIG. 7 is a flow chart of a method for target identification in large image data, in accordance with some embodiments.

FIG. 7 is a flow chart of a method 700 for target identification in large image data, in accordance with some embodiments.

At operation 710, the server 610 receives (e.g., from the image data repository 620 or the client device 630 via the network 640) a large image. In some other embodiments, the server 610 may receive the large image directly from the image capturing source. The large image has dimensions that exceed memory threshold dimensions (e.g., one million by one million pixels). The large image includes large image metadata. The large image metadata may include rational polynomial coefficient(s) (RPC) and/or replacement sensor model(s) (RSM). The large image metadata may include a look angle, a geographic location, and/or a ground sample distance.

At operation 720, the server 610 adjusts and orientation and a scaling of the large image based on the metadata. The orientation and the scaling of the large image are adjusted based on the RPC(s) and/or the RSM(s) in the metadata. For example, the server rotates the large image such that a gravitational downward direction corresponds to a direction toward a bottom side of the rotated large image. The server scales the large image such that a width and a height of a pixel in the scaled large image correspond to fixed physical dimensions.

At operation 730, the server 610 divides the large image into a plurality of image tiles. Each image tile has tile dimensions smaller than or equal to the memory threshold dimensions. A distance between center-points of two neighboring image tiles is determined based on the tile dimensions and target dimensions of a target to be identified within the large image. This is illustrated, for example, in FIG. 10, and described below. The target dimensions are smaller than the tile dimensions. As used herein, the center-point of a rectangular tile may refer to a point 50% of the tile's top-bottom height from the top of the tile and 50% of the tile's left-right width from the left side of the tile. In some cases, as the large image has dimensions that exceed the memory threshold dimensions, the orientation and scaling parameters are (optionally) computed at operation 720 and applied to cached regions of the large image at operation 730, when generating the image tiles in order to address memory constraints.

At operation 740, the server 610 provides the plurality of image tiles to an artificial neural network (ANN) for inference by the ANN. The ANN may be stored in a local memory of the server 610.

At operation 750, the server 610 identifies, using the ANN, at least a portion of the target in at least one image tile.

At operation 760, the server 610 identifies the target in the large image based on at least the portion of the target being identified in at least one image tile.

In some cases, each of the large image dimensions, the memory threshold dimensions, and the tile dimensions comprise a width and a height. The memory threshold dimensions may be determined based on a maximum size tile that the artificial neural network is capable of processing during training. The technology is described herein using two-dimensional images. However, it may be extended to three-dimensional images.

Figure 8:
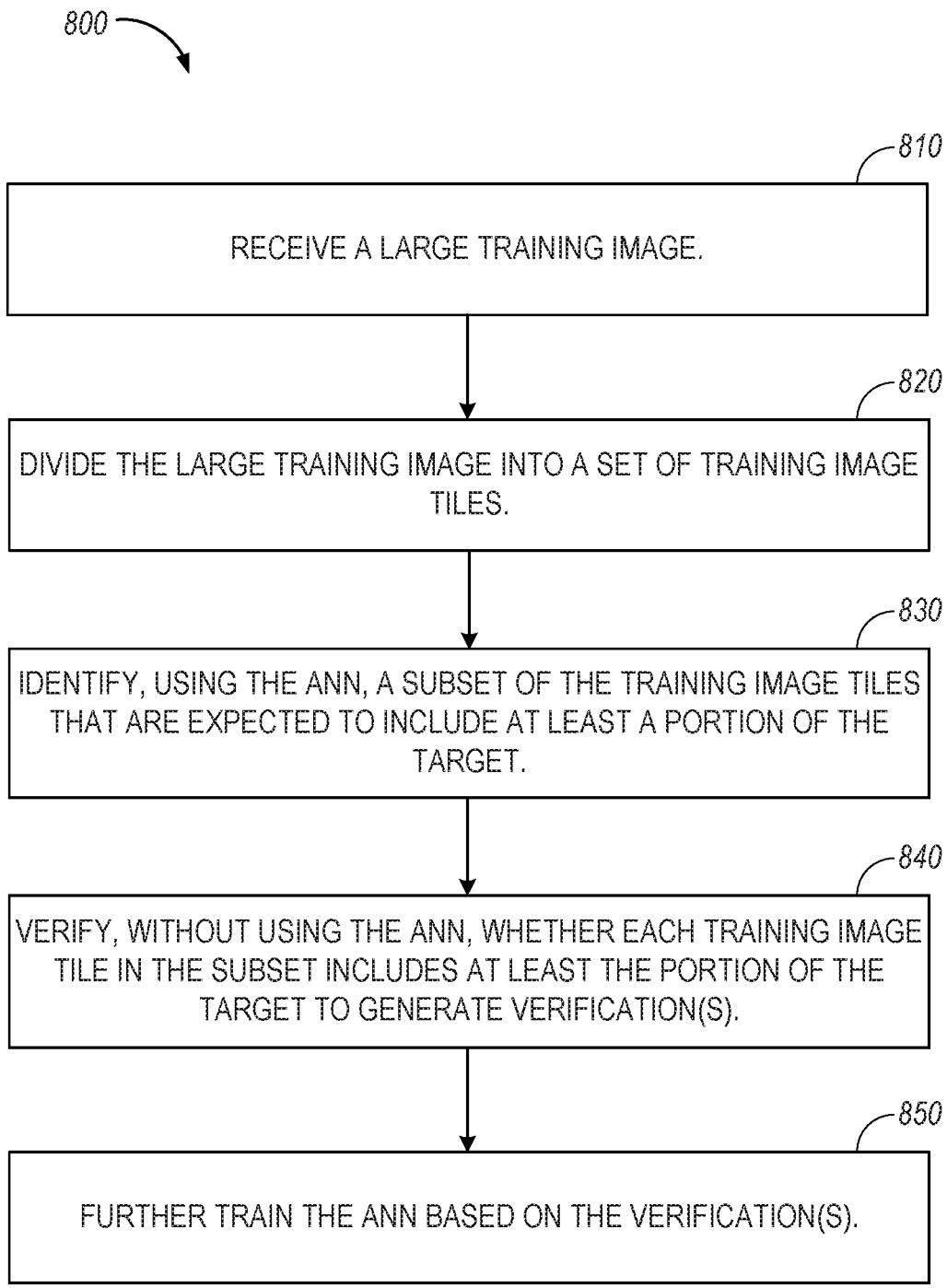
FIG. 8 is a flow chart of a method for training an artificial neural network for target identification in large image data, in accordance with some embodiments.

FIG. 8 is a flow chart of a method 800 for training an artificial neural network for target identification in large image data, in accordance with some embodiments. In addition the below, the artificial neural network may be trained using any of the techniques described herein, for example, the techniques described in conjunction with FIGS. 1-4.

At operation 810, the server 610 receives (e.g., from the image data repository 620 or the client device 630 via the network 640) a large training image. The large training image has large training image dimensions that exceed the memory threshold dimensions. The large training image may be one of a plurality of large training images. The plurality of large training images may be stored in the image data repository 620.

At operation 820, the server 610 divides the large training image into a set of training image tiles (similar to how the large image was divided into image tiles in the method 700 of FIG. 7).

At operation 830, the server 610 identifies, using the (partially trained) ANN, a subset of the training image tiles that are expected to include at least a portion of the target. For example, if the image 1100 of FIG. 11 (described below) is processed, and the target is a ship, the ANN may identify each of the ships 1105, 1110, and 1115, the fish farm 1120, and the small islands 1125 and 1130, as a ship. In one example, the (partially trained) ANN identifies, as a ship, all training image tiles that include something other than only water (e.g., a ship, a fish farm, a small island, and the like).

Figure 11:
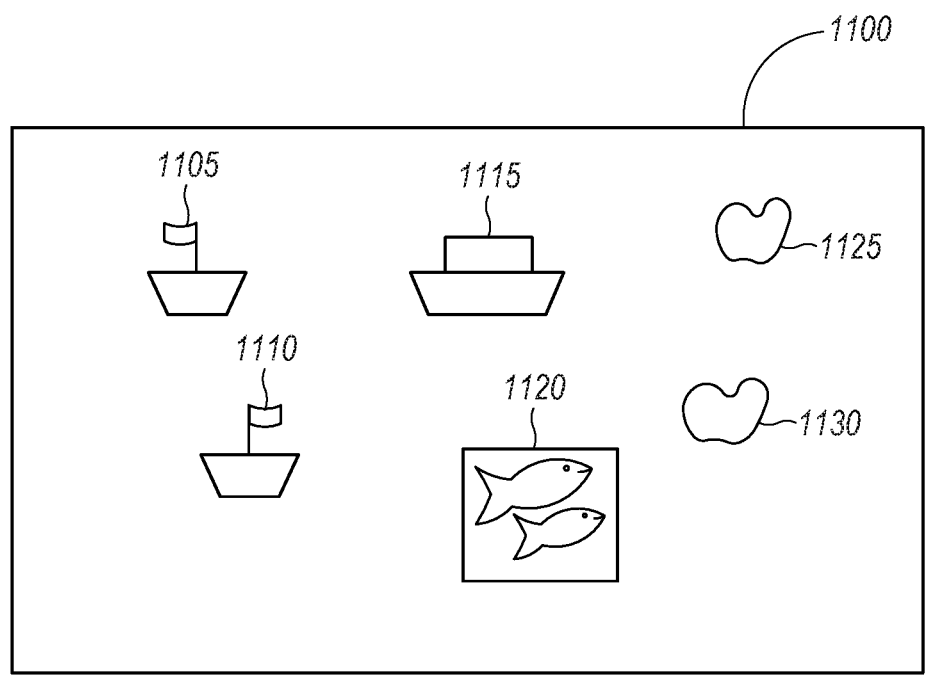
FIG. 11 illustrates an example of real targets and false targets in a large image, in accordance with some embodiments.

At operation 840, the server 610 verifies, without using the ANN, whether each training image tile in the subset includes at least the portion of the target to generate verification(s) (which may include one or more verifications). For example, the large training image (or the training image tiles from the subset) may be transmitted, via the network 640, to the client device 630 for verification, by a user of the client device, of whether the identification is correct. In the example of FIG. 11, the user may verify that the identifications of 1105, 1110, and 1115 as ships are correct, while the identifications of 1120, 1125, and 1130 as ships are incorrect. In other words, the verifying of operation 840 may include manually verifying by presenting each training image tile in the subset to a user of the client computing device 630.

At operation 850, the server 610 further trains the ANN based on the verification(s) generated in operation 840. In the example of FIG. 11, the ANN may be further trained based on the information that 1105, 1110, and 1115 are ships, while 1120, 1125, and 1130 are not ships.

In some cases, further training the ANN in operation 850 may include generating positive and negative examples (of the target) based on the one or more verifications. Further training the ANN in operation 850 may include generating negative examples based on a compression ratio included in the metadata, as in detail described below.

The large training image may be a compressed image with different compression ratios at different points (e.g., pixels) in the image. In some examples, the target is ship(s) and the large image is taken over an ocean. In clear water and clear conditions, there might be very high compression and the ANN may be trained to identify ships fairly quickly and easily. However, in a cluttered region of the large training image (e.g., where there are clouds/fog, fish farms, islands, and ships), there may be a low compression ratio and the ANN may be difficult to train, and thus benefit from more training iterations, training time, training examples, and the like. In short, areas of the large training image that have a low compression ratio may be more useful for training (and may require more training iterations) than areas of the large training image that have a high compression ratio.

As used herein, "positive examples" include real examples of the target, and "negative examples" include examples of things that are not the target. For example, a positive example of an image of a ship may be an image of a ship, and a negative example of an image of a ship may be an image of a small island (or an image of anything that is not a ship).

In some cases, the large training image is one of a plurality of large training images stored in an image data repository that are used for training the artificial neural network. Large images in the image data repository are divided, in a mutually exclusive manner, into: the plurality of large training images associated with a training geographic area, a plurality of large testing images associated with a testing geographic area that are used for testing the artificial neural network, and a plurality of large inference images associated with an inference geographic area that are used for inference with the artificial neural network. The training geographic area, the testing geographic area, and the inference geographic area are mutually exclusive geographic areas that do not intersect with one another. It is advantageous to separate the training, testing, and inference geographies because this ensures that geographic intersections of (the areas that cover) two large images (that occupy the same geographic area) are not used in two or more of training, testing, and inference.

Figure 9:
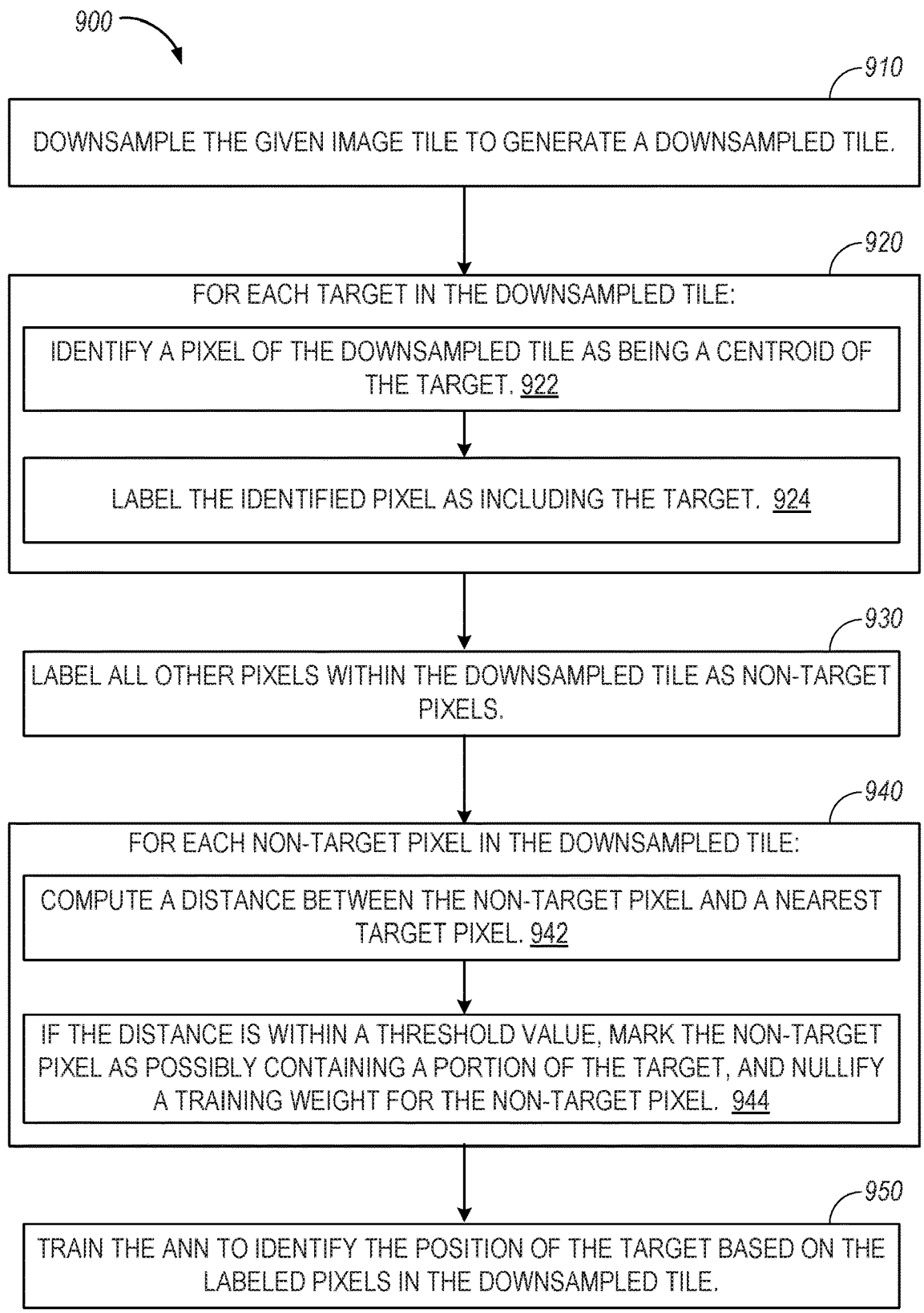
FIG. 9 is a flow chart of a method for training an artificial neural network to identify a position of a target in an image, in accordance with some embodiments.

FIG. 9 is a flow chart of a method 900 for training an artificial neural network to identify a position of a target in an image, in accordance with some embodiments.

At operation 910, the server 610 downsamples the given image tile to generate a downsampled tile. Each pixel of the downsampled tile corresponds to a plurality of pixels in the given image tile. This is illustrated, for example, in FIG. 12, described in detail below.

At operation 920, the server 610, for each target in the downsampled tile, identifies a pixel of the downsampled tile as being a centroid of the target (922) and labels the identified pixel as including the target (924). This is illustrated, for example, in FIG. 13, and described in detail below, where the downsampled tile 1300 includes the target 1330, with the point 1310 representing the centroid.

At operation 930, the server 610 labels the other pixels of the downsampled tile (all pixels aside from the centroid pixel of a target) as non-target pixels.

At operation 940, the server 610, for each non-target pixel in the downsampled tile, computes a distance between the non-target pixel and a nearest target pixel (942). If the distance is within a threshold value (e.g., inside the circle 1320), the server 610 marks the non-target pixel as possibly containing a portion of the target, and nullifies a training weight for the non-target pixel (944). The threshold value may be determined based on anticipated pixel dimensions of the target. In some cases, the threshold value corresponds to a maximum pixel distance from the centroid pixel to a furthest pixel on the edge of the target.

At operation 950, the server 610 trains the ANN to identify the position of the target based on the labeled pixel in the downsampled tile.

Figure 10:
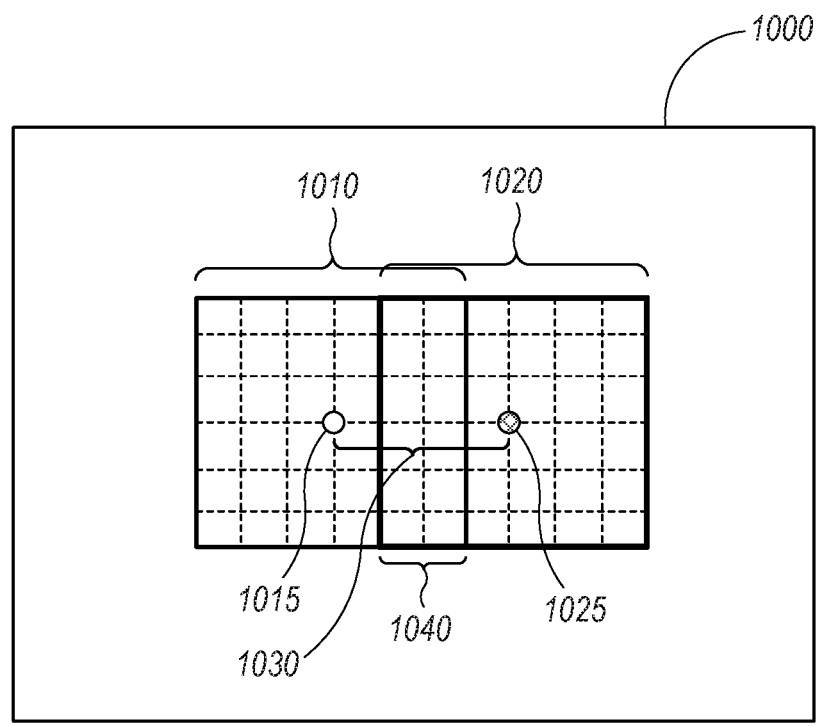
FIG. 10 illustrates an example of adjacent tiles in a large image, in accordance with some embodiments.

FIG. 10 illustrates an example of adjacent tiles 1010 and 1020 in a large image 1000, in accordance with some embodiments. In the illustrated example, the tiles 1010 and 1020 have the same tile dimensions, however in some embodiments adjacent tiles of different dimensions are possible. The tile 1010 has the center-point 1015 at its center, and the tile 1020 has the center-point 1025 at its center. As used herein, the center-point of a rectangular tile may refer to a point 50% of the tile's top-bottom height from the top of the tile and 50% of the tile's left-right width from the left side of the tile. The distance 1030 between the center-points 1015 and 1025 is smaller than a dimension (e.g., left-right width or top-bottom height) of the tile. This causes the adjacent tiles 1010 and 1020 to have an overlapping region 1040.

In some cases, the distance 1030 between the center-points 1015 and 1025 is determined based on the tile dimensions and target dimensions of a target to be identified within the large image. The distance 1030 may be calculated to ensure that an entire target having the target dimensions is fully captured within one tile (e.g., either the tile 1010 or the tile 1020).

FIG. 11 illustrates an example of real targets and false targets in a large image 1100, in accordance with some embodiments. For example, if the server 610 is being trained to identify ships, the real targets may include the ships 1105, 1110, and 1115. The false targets (which may be falsely identified in some stage of training the ANN of the server 610) may include the fish farm 1120, and the small islands 1125 and 1130. After the false targets 1120, 1125, and 1130, along with the real targets 1105, 1110, and 1115, are identified. A further stage of training the ANN may train the ANN to distinguish between the real targets and the false targets—thereby correctly identifying only the real targets and not the false targets in future training (and inference) stages.

Figure 12:
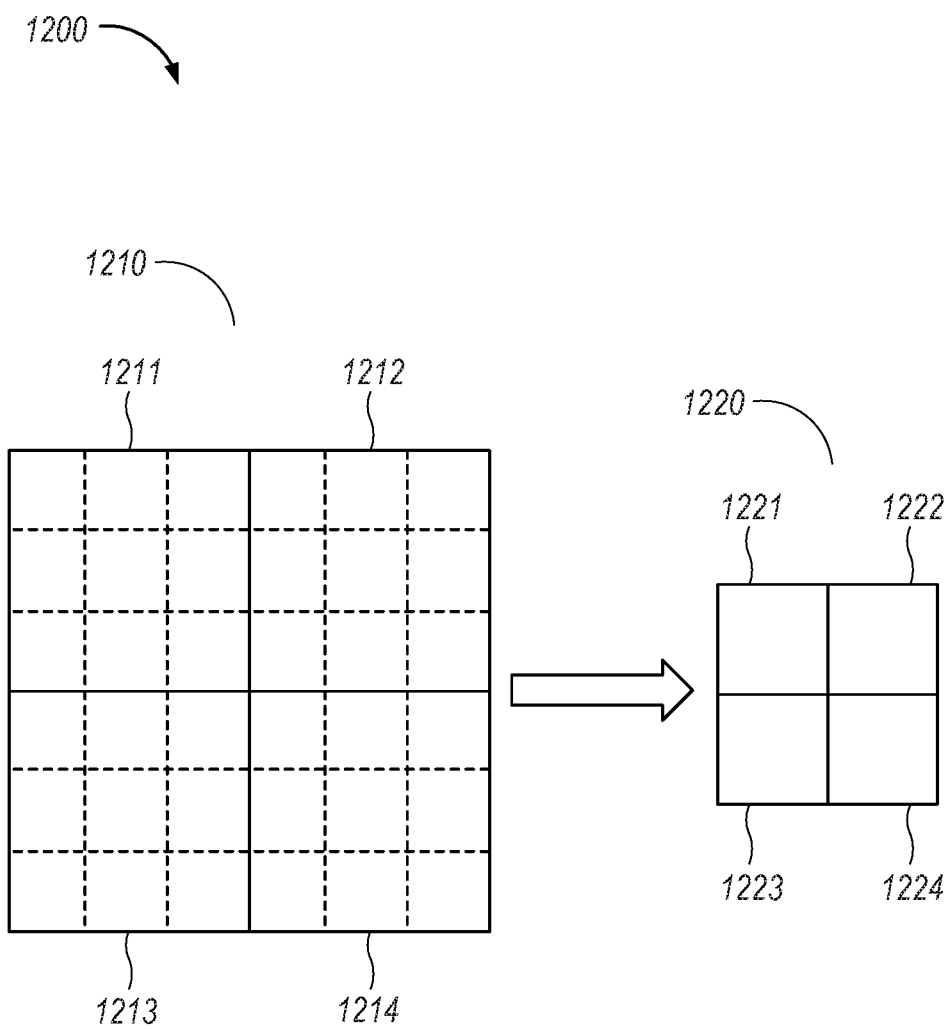
FIG. 12 illustrates an example of downsampling, in accordance with some embodiments.

FIG. 12 illustrates an example of downsampling 1200, in accordance with some embodiments. As shown, the image tile 1210 includes four blocks 1211, 1212, 1213, and 1214. Each block 1211, 1212, 1213, and 1214 includes multiple pixels. The image tile 1210 is transformed, by downsampling, into the downsampled tile 1220. The downsampled tile 1220 includes four pixels 1221, 1222, 1223, and 1224. The pixel 1221 corresponds to the block 1211 of the image tile 1210. Similarly the other pixels 1222, 1223, and 1224 correspond to the blocks 1212, 1213, and 1214 respectively. Each pixel 1221, 1222, 1223, and 1224 has a color that is computed based on (e.g., as an average of) all of the colors in the corresponding block 1211, 1212, 1213, and 1214, respectively.

It should be noted that, while FIG. 12 is illustrated with four blocks 1211, 1212, 1213, and 1214 and four pixels 1221, 1222, 1223, and 1224, the downsampling technology may be implemented with large image tile(s) and downsampled tile(s) having a much larger number of blocks or pixels. For example, the image tile may be 10,000 by 10,000 pixels and the downsampled tile may be 1000 by 1000 pixels, with each block being a 10 by 10 block of pixels.

Figure 13:
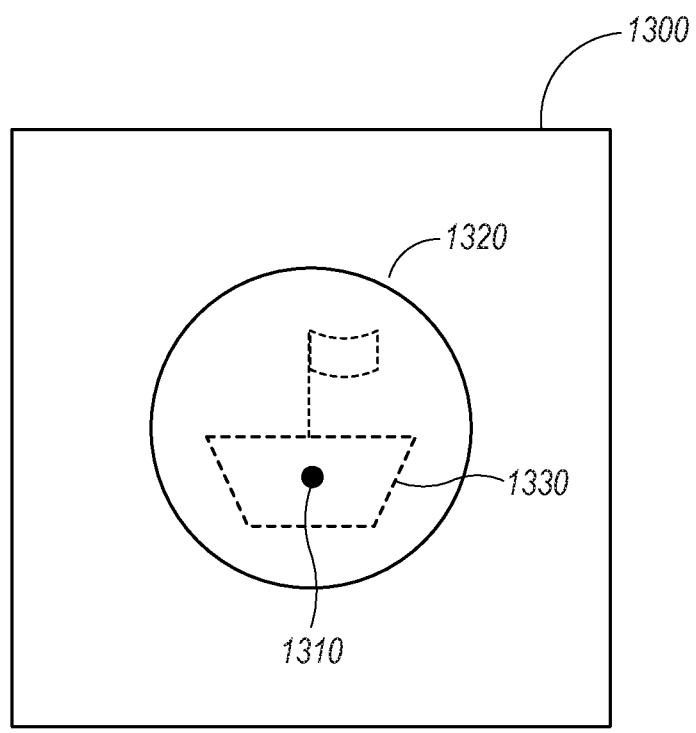
FIG. 13 illustrates an example downsampled tile that includes a target, in accordance with some embodiments.

FIG. 13 illustrates an example downsampled tile 1300 that includes a target 1330, in accordance with some embodiments. As shown, during processing of the downsampled tile 1300, the server 610 identifies the centroid pixel 1310 of the target 1330. The server 610 labels the centroid pixel 1310 as including the target. Other pixels in the downsampled tile 1300 are labeled as non-target pixels. However, pixels that are less than a threshold value of distance from the centroid pixel 1310 (pixels inside the circle 1320) might possibly include a portion of the target and, thus, have their training weights nullified, so they do not influence the ANN during its training to identify the position of the target. However, it should be noted that not all pixels inside the circle 1320 include the target, as the target is smaller than the circle. As there is uncertainty regarding whether pixels inside the circle 1320 (aside from the centroid pixel 1310) include the target, the training weight of those pixels is nullified. The radius of the circle 1320 may be determined based on anticipated pixel dimensions of the target 1330. In some cases, the radius of the circle 1320 to a maximum pixel distance from the centroid pixel 1310 to a furthest pixel on the edge of the target 1330.

Machine learning algorithms used to classify overhead imagery are trained on large numbers of image chips labeled for target image categories (positive image set) as well as non-target "background" images (negative training set). Background image chips are usually selected at random. To achieve high accuracy with few false-positives, it may be useful to train a classifier on background image chips that contain "confusers"—non-target objects or features likely to be misclassified as targets. However, the predominance of non-cluttered backgrounds such as water, fields and clouds leads to a relatively small percentage of confusers.

Some methods use random or manual background selection to form negative training sets. Manual selection of background chips is not only time-consuming and labor intensive, but also subject to human bias. The number of background chips typically exceed target chips by a significant margin (particularly in overhead imagery)—thus making background chip selection an important consideration. Random selection of background ensures variation and avoids bias, but is unlikely to provide a high percentage of confusers. Some aspects filter a negative training set to reduce redundancy or to increase the percentage of confusers, or to use compressibility of an image to determine its suitability for inclusion within a training set.

Some aspects select background images used to train machine classifiers based on the compressibility, or compression efficiency, of each image tile or chip. Compression efficiency of an image is the ratio of the original size of the image to the compressed size of the image for a given image quality, and is an inverse indicator of the visual complexity of image structure, measured in terms of entropy. Some aspects implement one or more of the following objectives for background image selection: (1) select background imagery that minimizes compression efficiency (thus maximizing confusers), and (2) match the distribution of compression efficiency to that of the target training set. For image tiles within a compressed National Imagery Transmission Format (NITF) image, these objectives place higher precedence on tiles compressed at lower compression efficiency, since these tiles are more likely to contain complex image structure that will confuse a machine classifier. Images of water, fields or clouds generally have high spatial redundancy and consequently low entropy, and therefore can be compressed at higher rates without compromising image quality. Due to their simplicity, fewer of these types of chips are needed in the negative training set. To achieve state-of-the-art performance for image classification, compute time for training the network is often a significant factor. For compressed NITFs, the compressibility of a tile can be measured with virtually no additional compute cost based on work already performed by the encoder. For example, given a fixed image quality, the compressed size of each tile in bytes provides a measure of its visual complexity.

Some aspects use an entropy measure to select image chips for a negative training set used to train an image classifier with one of two objectives: (1) maximize entropy of the negative training set within sampling constraints or (2) match distribution of chip entropy of negative training set to positive training set(s). Some aspects use compression efficiency (either in terms of low bitrate for a given quality, or high quality at a given bitrate) as a measure of the entropy of an image chip and potential selection for a training set. For NITF compressed images, some aspects use the compressed size of a tile and/or the achieved number of compressed layers for a tile as a virtually no-cost method to determine its compression efficiency, and to filter the selection of chips within the tile for use within a machine learning training set.

For some pattern recognition problems, the data model is unknown and require a tremendous training data volume to build the data model. Acquiring and labeling large data sets might, in some cases, be manually intensive and costly. Additionally, data are locally sparse for many pattern recognition problems which directly reduces the pattern recognition performance. To mitigate the data burden, generative adversarial networks (GANs) provide a larger effective sample size through synthetic data. However, the GANs learn a single model, and assume all data labels are identically modeled (i.e., all planes are similar).

GANs create a two-player game between a discriminator network and a generator network. The generator creates synthetic or fake examples and the discriminator decides whether these examples are real or fake examples created by the generator. The game continues as the generator learns to produce more realistic examples and the discriminator improves its ability to separate real from fake examples. Ideally, the system is optimized when the discriminator is approximately 50% (e.g., 45-55% or 40-60%) confident that the generator's examples are fake. Though, GANs have been used to generate synthetic imagery, some aspects use a GAN to improve training. Some aspects implement the GAN to understand the workflow required to the higher level machine learning.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An image processing apparatus, the apparatus comprising:
   processing circuitry and memory; the processing circuitry configured to perform operations comprising:
   receiving a large image having image dimensions that exceed memory threshold dimensions, the large image including metadata;
   adjusting an orientation and a scaling of the large image based on the metadata;
   dividing the large image into a plurality of image tiles, each image tile having tile dimensions smaller than or equal to the memory threshold dimensions;
   providing the plurality of image tiles to an artificial neural network;
   identifying, using the artificial neural network, at least a portion of the target in at least one image tile; and
   identifying the target in the large image based on the at least the portion of the target being identified in the at least one image tile.

2. The apparatus of claim 1, wherein a distance between center-points of two neighboring image tiles is determined based on the tile dimensions and target dimensions of a target to be identified within the large image, wherein the target dimensions are smaller than the tile dimensions.

3. The apparatus of claim 1, wherein the metadata includes at least one of a rational polynomial coefficient (RPC) and a replacement sensor model (RSM).

4. The apparatus of claim 3, wherein the orientation and the scaling of the large image are adjusted based on the at least one of the RPC and the RSM in the metadata.

5. The apparatus of claim 1, wherein each of the large image dimensions, the memory threshold dimensions, and the tile dimensions comprise a width and a height, and wherein the memory threshold dimensions are determined based on a maximum size tile that the artificial neural network is capable of processing during training.

6. The apparatus of claim 1, wherein the artificial neural network is trained by:
   receiving a large training image, wherein the large training image has large training image dimensions that exceed the memory threshold dimensions;
   dividing the large training image into a set of training image tiles;
   identifying, using the artificial neural network, a subset of the training image tiles that are expected to include at least a portion of the target;
   verifying, without using the artificial neural network, whether each training image tile in the subset includes the at least the portion of the target to generate one or more verifications; and
   further training the artificial neural network based on the one or more verifications.

7. The apparatus of claim 6, wherein verifying, without using the artificial neural network, whether each training image tile in the subset includes the at least the portion of the target comprises:
   manually verifying by presenting each training image tile in the subset to a user of a client computing device.

8. The apparatus of claim 6, wherein further training the artificial neural network comprises:
   generating positive and negative examples based on the one or more verifications; and
   generating negative examples based on a compression ratio included in the metadata.

9. The apparatus of claim 6, wherein:
   the large training image is one of a plurality of large training images stored in an image data repository that are used for training the artificial neural network;
   large images in the image data repository are divided, in a mutually exclusive manner, into: the plurality of large training images associated with a training geographic area and one or more pluralities of large testing images associated with one or more testing geographic areas that are used for testing the artificial neural network; and
   the training geographic area and each of the one or more testing geographic areas are mutually exclusive geographic areas that do not intersect with one another.

10. The apparatus of claim 6, wherein the artificial neural network is trained to identify a position of the target in a given image tile that includes the target by:
    downsampling the given image tile to generate a downsampled tile, wherein each pixel of the downsampled tile corresponds to a plurality of pixels in the given image tile;
    for each target in the downsampled tile:
    identifying, without using the artificial neural network, a pixel of the downsampled tile as being a centroid of the target; and
    labeling the identified pixel as including the target;
    labeling all other pixels within the downsampled tile as non-target pixels;

for each non-target pixel in the downsampled tile:
computing a distance between the non-target pixel and a nearest target pixel; and
if the distance is within a threshold value, marking the non-target pixel as possibly containing a portion of the target, and nullifying a training weight for the non-target pixel; and
training the artificial neural network to identify the position of the target based on the labeled pixels in the downsampled tile.

11. The apparatus of claim 10, wherein the threshold value is determined based on anticipated pixel dimensions of the target.

12. The apparatus of claim 1, wherein adjusting the orientation and the scaling of the large image based on the metadata comprises:
rotating the large image such that a gravitational downward direction corresponds to a direction toward a bott©m side of the rotated large image; and
scaling the large image such that a width and a height of a pixel in the scaled large image correspond to fixed physical dimensions.

13. A non-transitory machine-readable medium storing instructions which, when executed by processing circuitry of one or more machines, cause the processing circuitry to perform operations comprising:
receiving a large image having image dimensions that exceed memory threshold dimensions, the large image including metadata;
adjusting an orientation and a scaling of the large image based on the metadata;
dividing the large image into a plurality of image tiles, each image tile having tile dimensions smaller than or equal to the memory threshold dimensions;
providing the plurality of image tiles to an artificial neural network;
identifying, using the artificial neural network, at least a portion of the target in at least one image tile; and
identifying the target in the large image based on the at least the portion of the target being identified in the at least one image tile.

14. The machine-readable medium of claim 13, wherein a distance between center-points of two neighboring image tiles is determined based on the tile dimensions and target dimensions of a target to be identified within the large image, wherein the target dimensions are smaller than the tile dimensions.

15. The machine-readable medium of claim 13, wherein the metadata includes at least one of a rational polynomial coefficient (RPC) and a replacement sensor model (RSM).

16. The machine-readable medium of claim 15, wherein the orientation and the scaling of the large image are adjusted based on the at least one of the RPC and the RSM in the metadata.

17. An image processing method, the method comprising:
receiving a large image having large-image dimensions that exceed memory threshold dimensions, the large image including metadata;
adjusting an orientation and a scaling of the large image based on the metadata;
dividing the large image into a plurality of image tiles, each image tile having tile dimensions smaller than or equal to the memory threshold dimensions;
providing the plurality of image tiles to an artificial neural network;
identifying, using the artificial neural network, at least a portion of the target in at least one image tile; and
identifying the target in the large image based on the at least the portion of the target being identified in the at least one image tile.

18. The method of claim 17. wherein a distance between center-points of two neighboring image tiles is determined based on the tile dimensions and target dimensions of a target to be identified within the large image, wherein the target dimensions are smaller than the tile dimensions.

19. The method of claim 17, wherein the metadata includes at least one of a rational polynomial coefficient (RPC) and a replacement sensor model (RSM).

20. The method of claim 19, wherein the orientation and the scaling of the large image are adjusted based on the at least one of the RPC and the RSM in the metadata.

* * * * *